US008083188B2

(12) United States Patent
Kittle et al.

(10) Patent No.: US 8,083,188 B2
(45) Date of Patent: Dec. 27, 2011

(54) RISER CLAMP FOR IRRIGATION SPRINKLERS

(76) Inventors: Dallas Kittle, Jacksonville, FL (US); Jonathan P. Mcvety, Jacksonville, FL (US)

( * ) Notice: Subject to any disclaimer, the term of this patent is extended or adjusted under 35 U.S.C. 154(b) by 607 days.

(21) Appl. No.: 11/757,364

(22) Filed: Jun. 2, 2007

(65) Prior Publication Data

US 2008/0296404 A1 Dec. 4, 2008

(51) Int. Cl.
*A44B 17/00* (2006.01)
*F16L 3/13* (2006.01)

(52) U.S. Cl. ............. 248/74.2; 24/557; 24/570; 24/910; 24/545; 248/694

(58) Field of Classification Search ........................ None
See application file for complete search history.

(56) References Cited

U.S. PATENT DOCUMENTS

D502,986 S * 3/2005 Bandlamuri et al. ........ D23/214
* cited by examiner

*Primary Examiner* — Jack W. Lavinder
(74) *Attorney, Agent, or Firm* — Mark Young, PA

(57) ABSTRACT

A sprinkler riser clamp securely engages a spring-retractable riser of a pop-up sprinkler. The riser clamp includes a clamping body and a handle attached thereto. The clamping body is configured to snap onto and securely grip the spring-retractable riser of the pop-up sprinkler. The clamping body exerts a gripping force while the spring-retractable riser exerts a retracing force. The gripping force exerted by the clamping body exceeds the retraction force exerted by the spring-retractable riser. The clamping body includes a resilient first clamp arm and a resilient second clamp arm connected by a joint at one end of each arm. The clamping body includes an opening for receiving the spring-retractable riser. The first clamp arm and second clamp arm of the clamping body each include rounded bottom edges configured to facilitate installation and removal by pivoting motion. The handle is attached to the clamping body by an arm. The handle has blunt ends. Reinforcements are provided at a joint between the arm and the clamping body, structurally reinforcing the joint between the arm and the clamping body.

5 Claims, 4 Drawing Sheets

RISER CLAMP FOR IRRIGATION SPRINKLERS

FIELD OF THE INVENTION

This invention generally relates to irrigation sprinklers, and more particularly, to a riser clamp for supporting a riser of an irrigation sprinkler in a fully or partially raised position as selected by a user.

BACKGROUND

Irrigation sprinkler systems typically include a plurality of individual irrigation sprinkler heads or units fluidly coupled with a water supply line to provide irrigation water to selected terrain. The water supply line, couplings and other plumbing components are buried underground. Typically vertically extending pipes extend from t-fittings on the water supply line to the individual sprinkler units. The lengths of these vertical pipes are determined to achieve effective exposure of all or a portion of the individual sprinkler units in relation to the ground level and surrounding vegetation.

One type of sprinkler unit is a pop-up sprinkler that includes a pressure actuated hollow riser adapted to extend from a housing, as water pressure is applied. Water, which travels through the riser, is emitted from spray head with a nozzle at the top of the riser. When water pressure is relieved, the riser retracts into the housing under spring action. A cap prevents the spray head from being withdrawn into the housing upon retraction. The spray head, upon retraction, is drawn approximately flush with the cap. Retraction to a flush position is important so that the spray head and extended riser do not pose obstacles or interfere with and sustain damage from equipment (e.g., lawnmowers) used on the terrain.

Over time, nozzles may become fouled and clogged with sediment, debris, deposits and residue. The build-up may interfere with and eventually impede an effective spray from the sprinkler, unless the nozzle is cleaned or replaced.

Additionally, in many pop-up sprinklers, the nozzles are adjustable from a minimum (e.g., 0°) to a maximum (e.g., 360°) spraying angle. Nozzles of newly installed and replacement sprinklers must be adjusted to provide the correct coverage. Over time, changes in landscaping and terrain may require re-adjustment.

Maintenance, i.e., adjustment, removal, reinstallation and replacement entail manually extending the riser and holding it in an fully extended position while adjusting or replacing the nozzle. An installer must pull the riser from the housing with one hand. The extended riser is then captured and held to prevent it from being drawn back into the housing by the spring. Typically, manually operated pliers are used to hold the riser in the extended position, leaving a worker with one free hand to perform the maintenance using a screwdriver or similar tool. This process requires at least two hands and can be tiring if done repeatedly working against the spring. Often, considerable time and effort are consumed in exposing and adjusting or replacing the nozzle.

While various extension tools have been devised over the years, they have shortcomings. In general, they are cumbersome (U.S. Pat. No. 5,023,989), require removal of the sprinkler head (U.S. Pat. No. 6,957,477), and/or are not configured to secure a pop-up sprinkler riser in a fully extended position (U.S. D502,986) as well as in a partially extended position.

Accordingly, a need exists for an easy to use, cost effective, reliable tool for securing a pop-up sprinkler riser in fully and partially extended positions. The invention is directed to overcoming one or more of the problems and solving one or more of the needs as set forth above.

SUMMARY OF THE INVENTION

In one aspect of an exemplary embodiment of the invention, a sprinkler riser clamp is adapted to securely engage a spring-retractable riser of a pop-up sprinkler. The riser clamp includes a clamping body and a handle attached thereto. The clamping body is configured to snap onto and securely grip the spring-retractable riser of the pop-up sprinkler. The clamping body exerts a gripping force while the spring-retractable riser exerts a retracing force. The gripping force exerted by the clamping body exceeds the retraction force exerted by the spring-retractable riser. The clamping body includes a resilient first clamp arm and a resilient second clamp arm connected by a joint at one end of each arm. The resilient first clamp arm and the resilient second clamp arm each include a gripping surface adapted to engage the spring-retractable riser, each gripping surface having a radius of curvature that is substantially the same as the radius of curvature of an outer diameter of the spring-retractable riser. The gripping surface radius of curvature is approximately 6 to 12.5 mm (i.e., diameter 12 to 25 mm). The clamping body includes an opening for receiving the spring-retractable riser. The clamping body extends around the spring-retractable riser by 360° minus angle $\alpha$, angle $\alpha$ being 30° to 175°, or 50° to 150°, and the opening is 8 to 20 mm, or 10 to 15 mm. The first clamp arm and second clamp arm of the clamping body each include rounded bottom edges configured to facilitate installation and removal by pivoting motion. The handle is attached to the clamping body by an arm. The handle has blunt ends. Reinforcements are provided at a joint between the arm and the clamping body, structurally reinforcing the joint between the arm and the clamping body.

Optionally, furrows are formed in the clamping body to facilitate deflection of the clamp arms for purposes of receiving the riser. The furrows have a curved profile to avoid stress concentrations, the curved profile having a radius of curvature r of 1 to 4 mm.

As another optional feature, an aperture 185 may be provided in the clamp 100, such as in the arm 160. The aperture provides means for engaging the clamp 100 with a hook, tether, wire, keychain or the like, to facilitate hanging, storage and carrying.

The sprinkler riser clamp may be comprised of polyvinyl chloride (PVC), polyethylene, polypropylene, polystyrene, acrylics, cellulosics, acrylonitrile-butadiene-styrene terpolymers, urethanes, thermo-plastic resins, thermo-plastic elastomers (TPE), acetal resins, polyamides, polycarbonates or polyesters. Optionally, a thermochromic additive adapted to achieve a color change at a determined temperature may be included. As another option, a photochromic additive adapted to achieve a color change at a determined lighting condition may be included. As yet another option, a phosphorescent polymer additive may be included to emit absorbed light, the emitted light being visible in darkened conditions.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the invention is not limited to the exemplary embodiments depicted in the figures or the shapes, relative sizes, proportions or materials shown in the figures.

DETAILED DESCRIPTION

Figure 1:
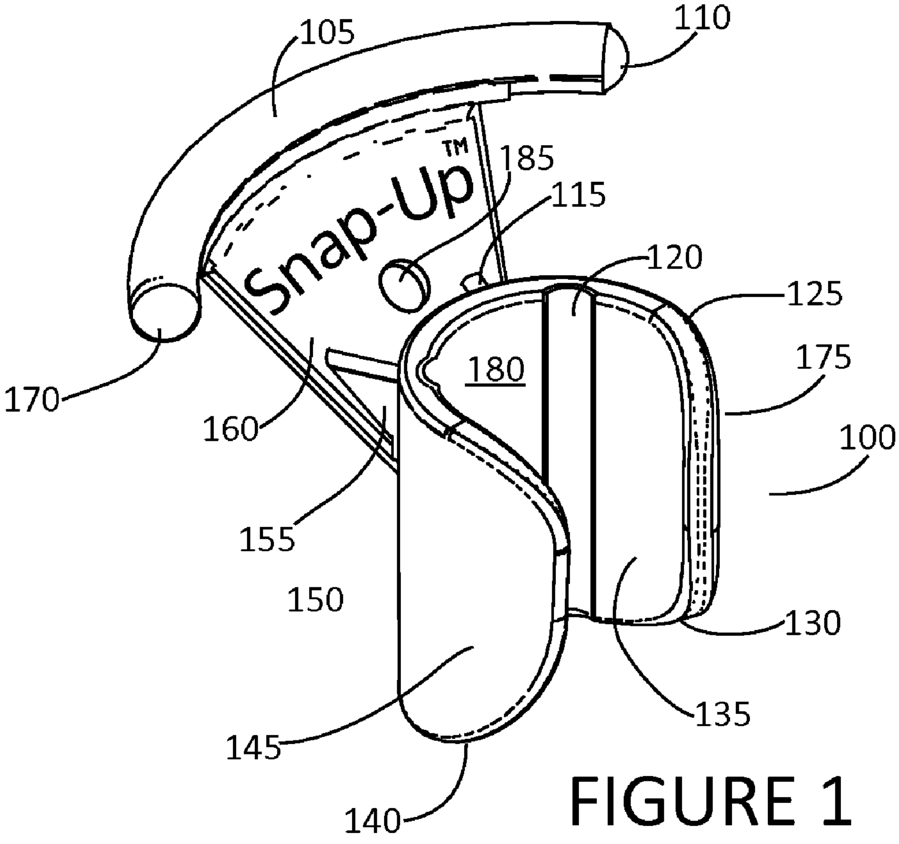
FIG. 1 is a first perspective view of an exemplary riser clamp for supporting a riser of an irrigation sprinkler in a fully or partially raised position in accordance with principles of the invention.
Figure 2:
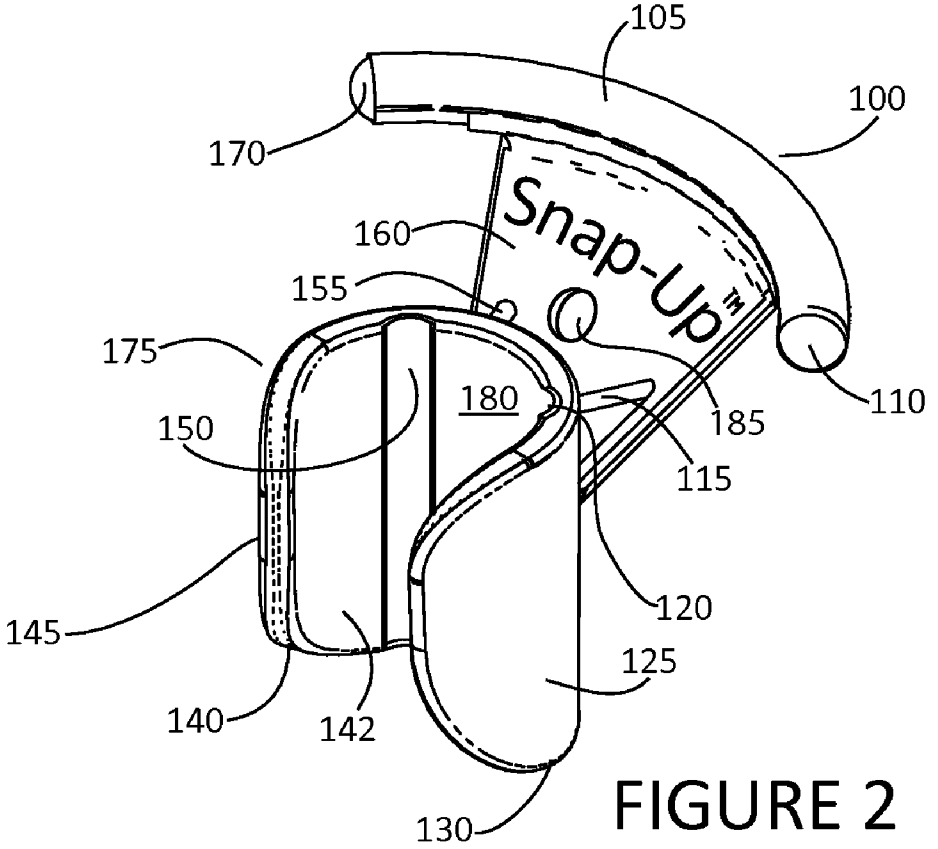
FIG. 2 is a second perspective view of an exemplary riser clamp for supporting a riser of an irrigation sprinkler in a fully or partially raised position in accordance with principles of the invention.

Referring to the Figures wherein like components are given the same reference numerals, an exemplary clamping tool (i.e., clamp) for securing a pop-up sprinkler riser in fully and partially extended positions in accordance with the principles of the invention is conceptually illustrated. With reference to FIGS. 1 and 2, the tool 100 includes a clamping body 175 and a handle 105 attached thereto by an arm 160.

The clamping body 175 is configured to snap onto and securely engage the cylindrical riser of a pop-up sprinkler. The clamping body 175 includes a resilient first clamp arm 125 and a resilient second clamp arm 145 connected by a joint 180 at one end of each arm 125, 145. The opposite end of each arm 125, 145 is a free end.

Figure 4:
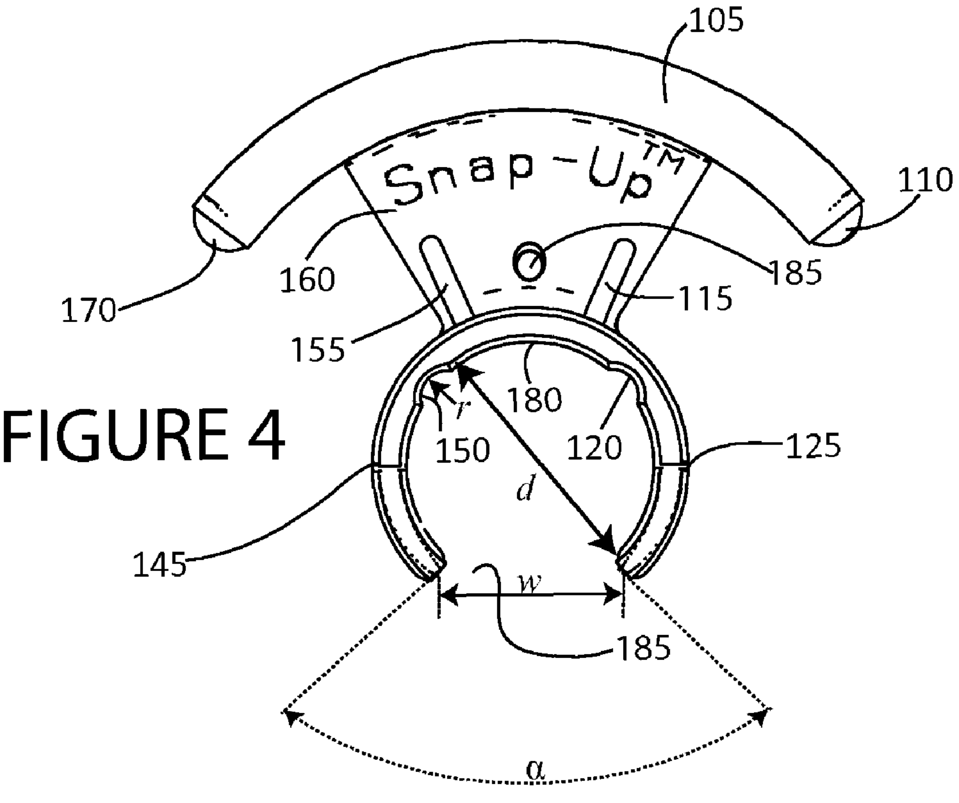
FIG. 4 is a top plan view of an exemplary riser clamp for supporting a riser of an irrigation sprinkler in a fully or partially raised position in accordance with principles of the invention.

The first and second clamp arms 125 and 145 can be substantially similarly shaped and generally include the same or similar features. For example, the gripping surface 135 of the first clamp arm 125 is sized and contoured to the shape of a riser. In other words, the gripping surface 135 of the first clamp arm 125 features a radius of curvature that is substantially the same as (i.e., about equal to or slightly smaller than) the radius of curvature of the outer diameter of a riser. The gripping surface 142 of the second clamp arm 145 also features a radius of curvature that is substantially the same as the radius of curvature of the outer diameter of a riser. Likewise, the joint 180 features a radius of curvature that is substantially the same as the radius of curvature of the outer diameter of a riser. Thus, the clamping body 175 comprised of the first clamp arm 125 and the second clamp arm 145 connected by the joint 180 features an inner diameter d, as shown in FIG. 4, that is about the same size as the outer diameter of a riser. By way of example and not limitation, the diameter may be 12 to 25 mm, and preferably 17 to 19 mm, and more preferably 18.3 mm.

The clamping body 175 comprised of the first clamp arm 125 and second clamp arm 145 connected by the joint 180 includes an opening 185 for receiving a riser, e.g., by sliding or snapping the clamping body 175 onto a riser. Thus, the clamping body does not extend a full 360°. Instead, the clamping body comprised of the first clamp arm 125 and second clamp arm 145 connected by the joint 180 extends 360° minus angle $\alpha$, which, by way of example and not limitation, may be approximately 30° to 175°, and preferably 50° to 150° mm, and more preferably about 100°. The width w of the opening 185 is smaller than the outer diameter of the riser, enabling the clamping body 175 to securely grip the riser when urged onto the riser, as shown in FIG. 4. By way of example and not limitation, the width w may be 8 to 20 mm, and preferably 10 to 15 mm, and more preferably about 12.9 mm.

Figure 3:
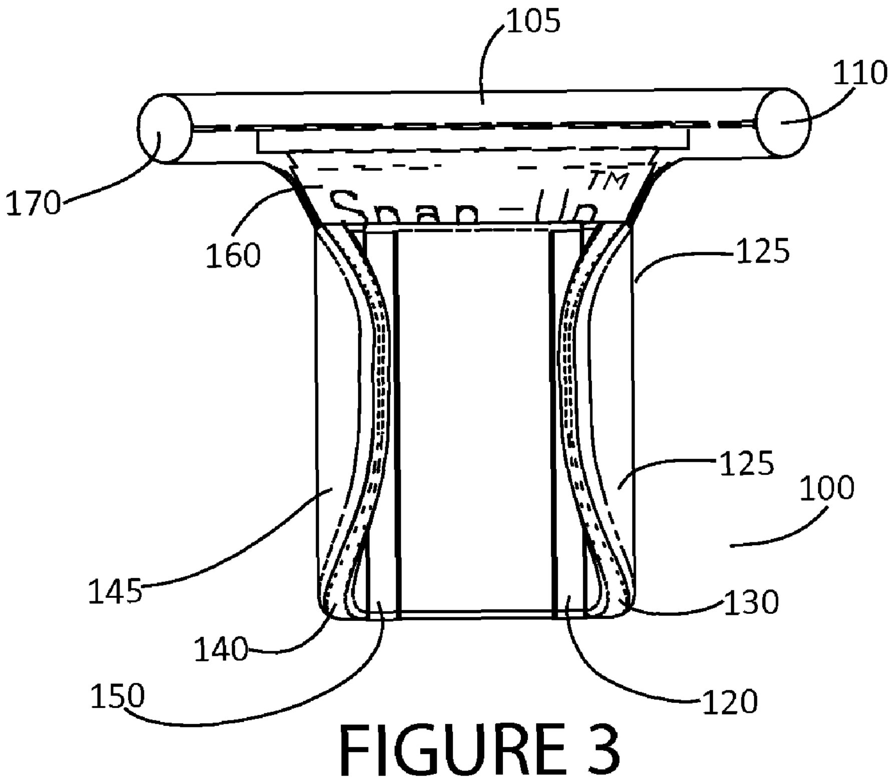
FIG. 3 is a front plan view of an exemplary riser clamp for supporting a riser of an irrigation sprinkler in a fully or partially raised position in accordance with principles of the invention.
Figure 5:
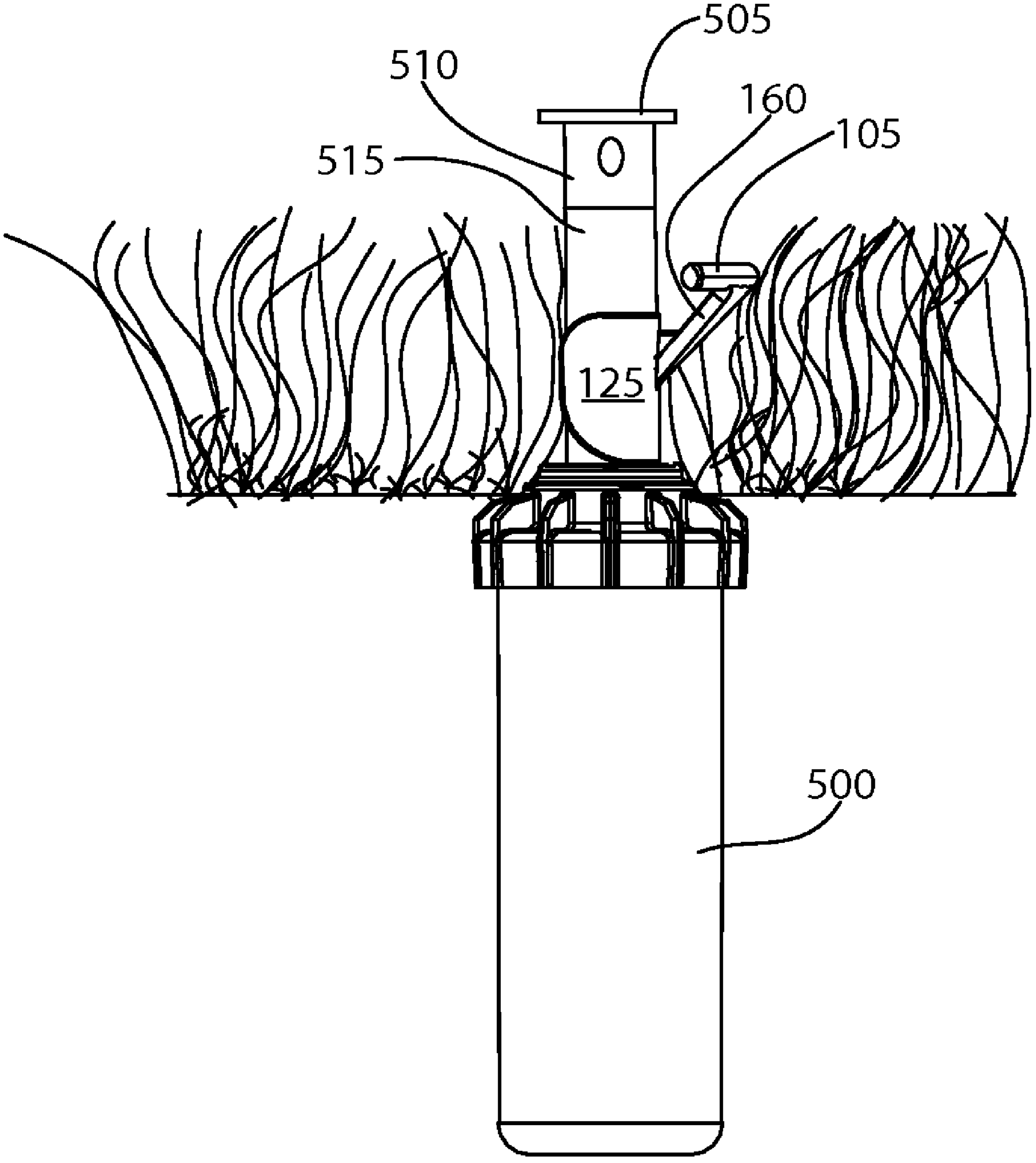
FIG. 5 is a side view of an installed exemplary riser clamp supporting a riser of an irrigation sprinkler in a fully raised position in accordance with principles of the invention.
Figure 6A:
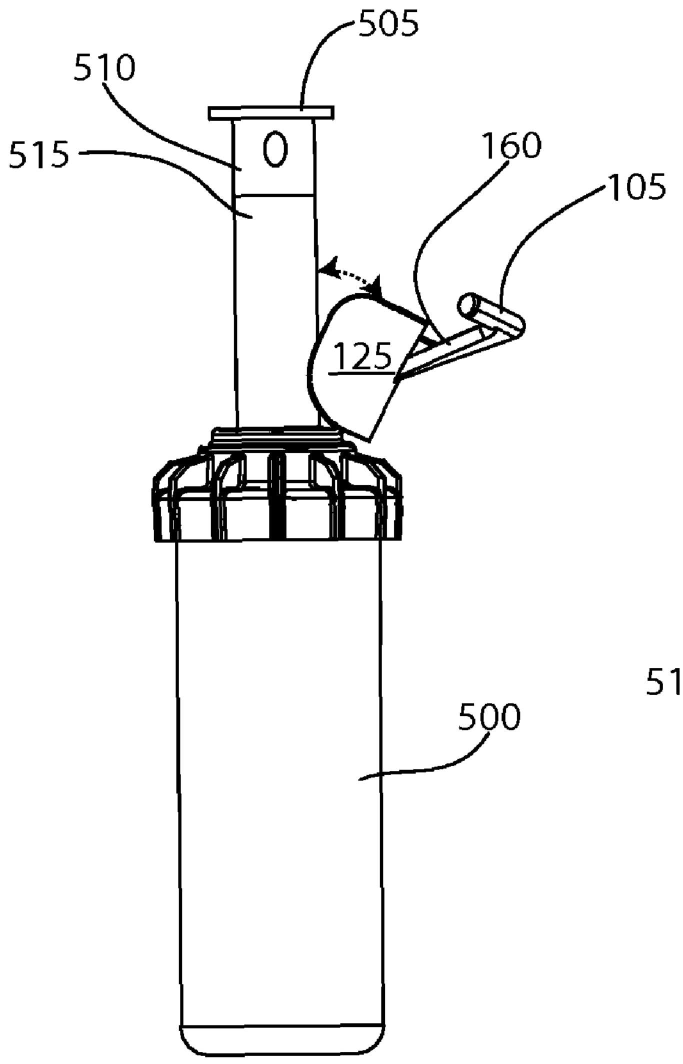
FIGS. 6A and 6B are side views of an exemplary riser clamp being pivoted for installation on or removal from, and installed on, a riser of an irrigation sprinkler in a raised position in accordance with principles of the invention.
Figure 6B:
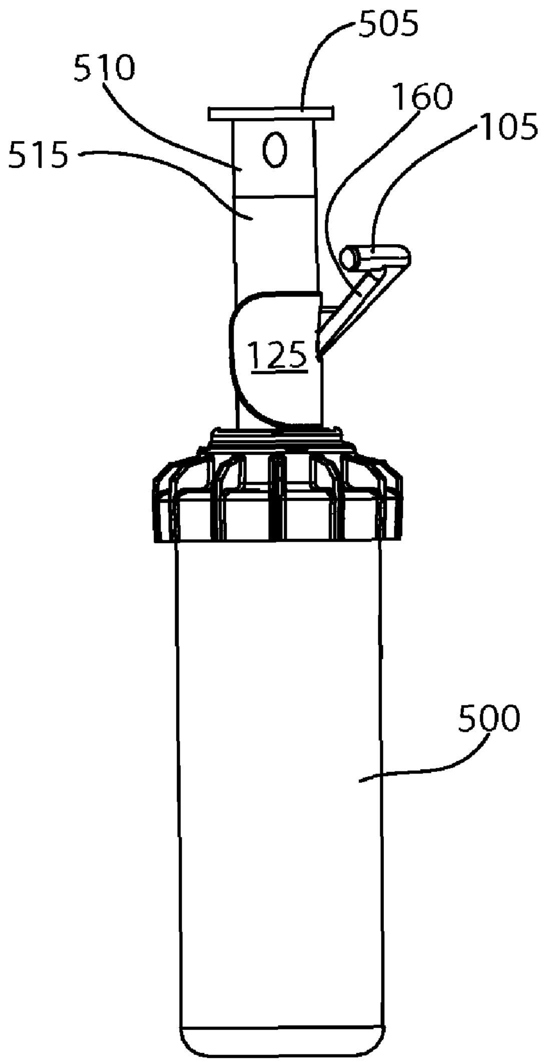

The first clamp arm 125 and second clamp arm 145 of the clamping body 175 include rounded bottom edges 130 and 140 along their free ends, as shown in FIG. 3. The rounded edges 130, 140 facilitate installation and removal of the tool 100 by pivoting or rocking motion to engage or disengage a riser, as conceptually illustrated in FIGS. 6A and 6B. The pop-up sprinkler includes a housing 500, a riser 515, a nozzle 510 and a cap 505. As shown in Figure A, the bottom of the clamp arms 125, 145 may be urged against the extended riser 515 to facilitate entry of the riser 515 through the opening 185 into the space between the arms 125, 145. When installed, as shown in FIGS. 5 and 6B, the arms 125, 145 of the clamping tool 100 grip the periphery of the riser 515. The gripping force exerted by the arms 125, 145 exceeds the retraction force generated by the return spring (not shown) within the housing 500 of the sprinkler assembly. Consequently, the gripping action of the clamping body 175 of the clamping tool 100 prevents retraction of the riser 515 beyond the bottom edge of the clamping body 175.

Optionally, furrows 120, 150, as shown in FIG. 4, are formed in the clamping body 175 to facilitate deflection of the arms 125, 145 for purposes of receiving the riser 515. The exemplary furrows 120, 150 have a curved profile to avoid stress concentrations. By way of example and not limitation, a radius of curvature r may be 1 to 4 mm, and preferably 1.5 to 2.5 mm, and more preferably about 2 mm.

The handle 105 is attached to the clamping body 175 by an arm 160. In a preferred embodiment, the handle 105 features blunt (e.g., rounded) ends 110, 170 and is ergonomically contoured to facilitate grasping and manipulating with one's fingers. The blunt ends 110, 170 avoid pinching and scratching of fingers and hands. The arm 160 attaches the handle to the body 175, preferably towards the middle of the body 175, to facilitate installation and removal of the clamp 100 by pivoting motion. Optionally, reinforcing ribs, such as gussets 115, 155 are provided to structurally reinforce the joint between the arm 160 and body 175, where stress concentrations are likely to develop during installation and removal.

Those skilled in the art will appreciate that the invention is not limited to such a handle and arm configuration. Other handle and arm configurations, including lever and tab-like handles projecting from the clamping body 175, may be utilized and are intended to come within the scope of the invention.

Referring now to FIG. 5 a profile view of an exemplary an installed irrigation sprinkler equipped with a riser clamp in accordance with principles of the invention is shown. A water supply line (not shown) comprises a conduit for flow of water under pressure to the sprinkler body 500 fluidly coupled thereto to irrigate surrounding vegetation, such as grass, shrubs, agricultural plants, and the like. As shown, the sprinkler body 500 has a pop-up riser 515 with a sprinkler head 325 with a spray nozzle and a cap 505. The riser 515 is adapted to extend from the housing 500 when water pressure is applied. When water pressure is relieved, the extended riser 515 retracts into the housing 500 under spring action, unless a riser clamp 100 according to the invention is installed. The clamp 100 securely grips the riser, thereby impeding retraction of the riser 515 even when the water pressure is removed.

Upon removal of the clamp 100, the extended riser 515 retracts into the housing 500 under spring action.

A riser clamp according to principles of the invention may be comprised of various materials, such as metal and/or plastic. In an exemplary implementation, the extended retractable riser assembly is comprised of a rigid plastic, such as polyvinyl chloride (PVC), polyethylene, polypropylene, polystyrene, acrylics, cellulosics, acrylonitrile-butadiene-styrene terpolymers, urethanes, thermo-plastic resins, thermo-plastic elastomers (TPE), acetal resins, polyamides, polycarbonates and polyesters. While many other materials may be used alone or in combination with the aforementioned materials and/or other materials, without departing from the scope of the present invention, preferably the material is relatively inexpensive, easy to use in manufacturing operations and results in an aesthetically acceptable, durable, waterproof, weather resistant product. The material may further include additives to provide desired properties such as desired colors, structural characteristics, glow-in-the dark properties and thermal reactivity (e.g., color changes according to heat).

By way of example and not limitation, a plastic handle 120 may optionally be formulated to change color when it reaches a predetermined or higher temperature. This can be accomplished by mixing a thermochromic additive to the base material in an amount that is sufficient to achieve a desired color changing range. As an example, a mixture of approximately 5% to 30% (pbw) of Matsui International Co., Inc.'s Chromicolor® concentrate may be introduced to plastic base material, to provide a plastic structure that visibly changes color at a determined elevated temperature, such as approximately 90 degrees Fahrenheit or higher. Such a color change may alert users to extreme temperature conditions so that precautions may be taken for their well being.

Alternatively, a photochromic additive may be added to a plastic base material in an amount that is effective to achieve a desired color change when the applicator assembly 100 is exposed to certain lighting conditions. As an example, a mixture of approximately 5% to 35% (pbw) of Matsui International Co., Inc.'s Photopia® additive may be introduced to plastic base material, to provide a plastic structure that visibly changes color in the presence of sunlight or ultraviolet light. Again, such a color change may alert users to extreme temperature conditions so that precautions may be taken for their well being.

As another alternative, phosphorescent polymer additives, such as aluminate based phosphors, may be added to adsorb light energy and continue to release that energy as visible light after the energy source is removed. Advantageously, such an embodiment provides a tool that is easy to locate in darkened conditions, making it easy to spot even at nighttime. Such a handle may facilitate finding the clamp 100 in darkened conditions.

The riser clamp 100 may be produced using any suitable manufacturing techniques known in the art for the chosen material, such as (for example) injection, compression, structural foam, blow, or transfer molding; polyurethane foam processing techniques; vacuum forming; and casting. Preferably, the manufacturing technique is suitable for mass production at relatively low cost per unit, and results in an aesthetically acceptable product with a consistent acceptable quality. The extended retractable riser assembly is preferably sufficiently strong and weather resistant such that it does not structurally fail from the stresses and environmental conditions encountered during use.

While an exemplary embodiment of the invention has been described, it should be apparent that modifications and variations thereto are possible, all of which fall within the true spirit and scope of the invention. With respect to the above description then, it is to be realized that the optimum relationships for the components of the invention, including variations in form, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A sprinkler riser clamp adapted to securely engage a spring-retractable riser of a pop-up sprinkler, said riser clamp comprising a clamping body and a handle attached thereto, said clamping body being configured to snap onto and securely grip the spring-retractable riser of the pop-up sprinkler, said clamping body exerting a gripping force and said spring-retractable riser exerting a retracing force, the gripping force exerted by the clamping body exceeding the retraction force exerted by the spring-retractable riser, wherein the clamping body includes a resilient first clamp arm and a resilient second clamp arm connected by a joint at one end of each arm; the resilient first clamp arm and the resilient second clamp arm each include a gripping surface adapted to engage the spring-retractable riser, each gripping surface having a radius of curvature that is substantially the same as the radius of curvature of an outer diameter of the spring-retractable riser; the gripping surface radius of curvature is approximately 6 to 12.5 mm; the clamping body includes an opening for receiving the spring-retractable riser;

further comprising furrows formed in the clamping body to facilitate deflection of the clamp arms for purposes of receiving the riser, said furrows having a curved profile to avoid stress concentrations, said curved profile having a radius of curvature r of 1 to 4 mm.

2. A sprinkler riser clamp according to claim 1, the sprinkler riser clamp being comprised of a material from the group consisting of polyvinyl chloride (PVC), polyethylene, polypropylene, polystyrene, acrylics, cellulosics, acrylonitrile-butadiene-styrene terpolymers, urethanes, thermo-plastic resins, thermo-plastic elastomers (TPE), acetal resins, polyamides, polycarbonates and polyesters.

3. A sprinkler riser clamp according to claim 1, the sprinkler riser clamp including a thermochromic additive adapted to achieve a color change at a determined temperature.

4. A sprinkler riser clamp according to claim 1, the sprinkler riser clamp including a photochromic additive adapted to achieve a color change at a determined lighting condition.

5. A sprinkler riser clamp according to claim 1, the sprinkler riser clamp including a phosphorescent polymer additive adapted to emit absorbed light, said emitted light being visible in darkened conditions.

* * * * *